T. G. SAXTON.
PISTON.
APPLICATION FILED OCT. 14, 1920.

1,410,517. Patented Mar. 21, 1922.

INVENTOR
T. G. SAXTON

UNITED STATES PATENT OFFICE.

THOMAS GUMI SAXTON, OF BOONTON, NEW JERSEY, ASSIGNOR OF ONE-FOURTH TO P. GEORGE COLEMAN, OF BROOKLYN, NEW YORK.

PISTON.

1,410,517. Specification of Letters Patent. Patented Mar. 21, 1922.

Application filed October 14, 1920. Serial No. 416,974.

*To all whom it may concern:*

Be it known that I, THOMAS G. SAXTON, a citizen of the United States, and resident of Boonton, in the county of Morris and State of New Jersey, have invented a new and Improved Piston, of which the following is a full, clear, and exact description.

It is well appreciated in connection with pistons that numerous difficulties have been experienced.

The first is to be found in that the side face of the piston contacts with the inner face of the cylinder, and due to the restricting action of the former within the latter a rapid wearing takes place, which wearing is quite often accelerated by an improper or inefficient lubrication. Theoretically, the piston does not come in contact with the face of the cylinder, rings being provided for this purpose, which rings are readily removable. However, in practice this is not the case, and the defect above mentioned comes into being.

The second vital defect is to be found in connection with the wrist pin. Due to the association of this pin with the piston, a wearing has heretofore occurred, which wearing results in the pin becoming oval, which was in turn transmitted to the piston opening.

With this in view, I have provided a piston in which certain construction will be embodied, which construction will provide a medium whereby any wear incident to a moving engagement between the piston and cylinder will be reduced to a harmless factor.

A further object of my invention is the construction of a piston which shall embody a wrist pin in which the wear will be reduced to a minimum, and evenly distributed.

Reference is had to the attached sheet of drawings as illustrating one practical embodiment of my invention, and in which—

Figure 1:
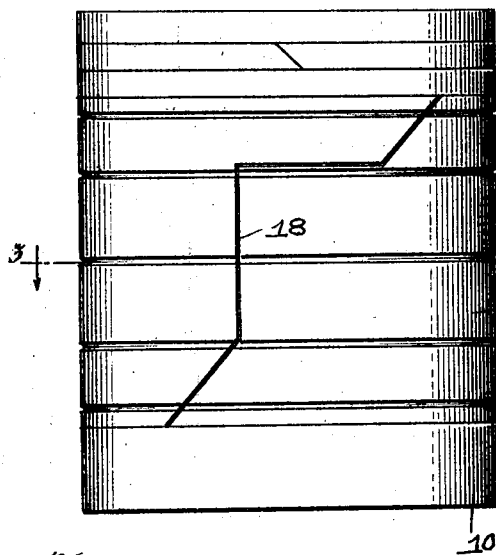
Figure 1 is a side view of a piston constructed in accordance with my invention, and showing the same in completed form.
Figure 2:
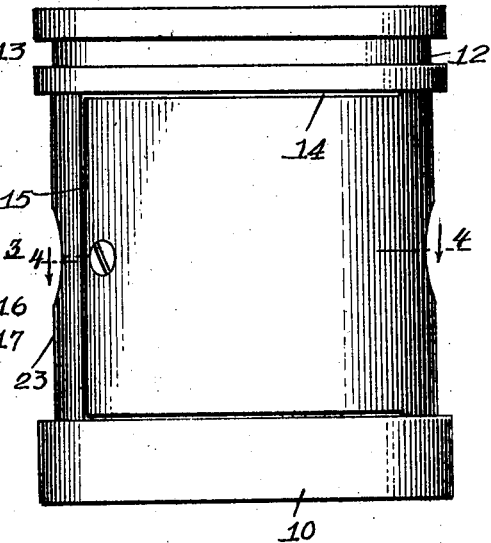
Figure 2 is a view similar to Figure 1, but showing some of the parts removed.

In these views the reference numeral 10 indicates the body of a piston which is hollow, and conveniently formed with inwardly extending wrist pin bearings 11, together with a wrist portion intermediate its ends.

The upper end of the piston may be conveniently formed with any suitable number of piston ring grooves 12, which may receive any conventional type of ring 13 for forming a tight seal between the extension chamber and crank case of the engine.

It is now to be noted that the reduced or wrist portion of the piston is cut through circumferentially, i. e. parallel to the upper and lower edges of the same as at 14, these cuts being in communication with one another, by means of a further cut 15 extending parallel to the longitudinal axis of the piston. Thus an apron is provided, which apron forms an integral portion of the piston itself, and as will be readily appreciated embodies flexible qualities by virtue of its construction.

Figure 3:
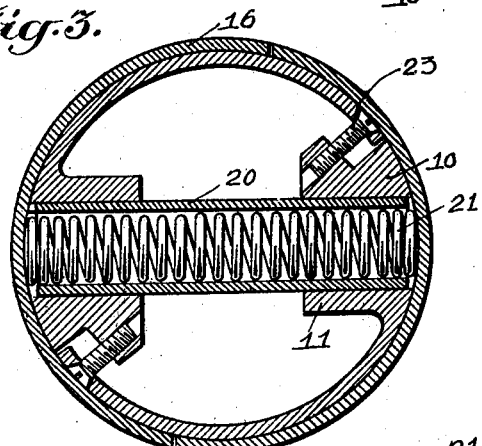
Figure 3 is a sectional end view taken along the line 3—3 of Figure 1.
Figure 5:
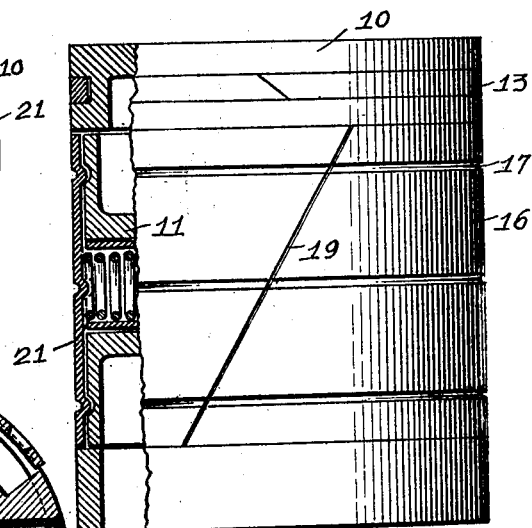
Figure 5 is a fragmentary side view of a piston constructed in accordance with my invention.
Figure 4:
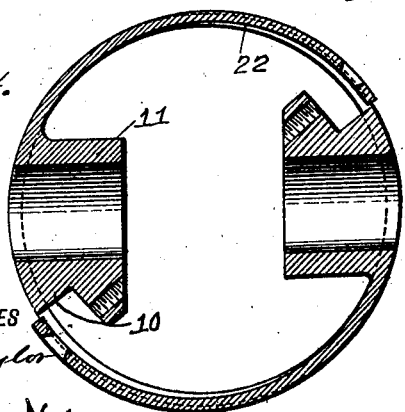
Figure 4 is a sectional end view taken along the lines 4—4 of Figure 2.

A shoe, preferably of a material softer than that of the cylinder walls or piston, is now provided, which shoe includes a body portion 16 preferably provided in its outer face with a series of grooves 17 which may be either turned or rolled, and serve as oil carriers. Further, it will be noted, as has been illustrated in Figure 3, that the shoe 16 is formed in two sections, the abutting edges of the shoes being further formed with a step-cut 18, as illustrated in Figure 1, or a diagonal cut 19, as has been illustrated in Figure 5.

Thus it will be seen that I have devised a sectional shoe a portion of which is preferably utilized, in connection with my improved piston, the portions of said shoe being of such a construction that they will cooperate with and be retained upon the body of the piston.

It will further be noted that the abutting edges of the shoe-sections are conveniently arranged at points intermediate the wrist pin bearings 11, and it will be understood that by virtue of the resilient construction embodied by the flexible skirts 22 of the piston that the shoe will be forced outwardly at points at which its inner face is engaged by the skirt.

To further effect an expansion in all directions a hollow wrist pin 20 may be conveniently positioned in the bearings 11, and an expansion spring 21 is, in this instance mounted within the sleeve thus formed, and has its outer ends bearing against the inner faces of abutting shoe sections at points approximately intermediate the extremities of each, thus effecting a radial pressure at these points also.

It will be obvious, that any suitable medium may be utilized for regulating the tension exerted by the flexible skirts or aprons 22, such as for example, screws 23 having their heads engaging the skirt 22, their inner ends conveniently co-acting with a fixed portion of the piston, such as the wrist pin bearings 11.

By the construction described, it will be appreciated that I have constructed a piston in which skirts are provided, which skirts are resilient, thus tending to force their outer faces against the walls of the cylinder.

By providing a shoe, adapted to over-lie the skirt, and by forming the former of a material softer than the cylinder, this shoe will be forced against the inner face of the piston and will receive all of the wear incident to the motion between the piston and the cylinder, whereby no damage will result in operation to either the piston or cylinder.

This action, as will be well appreciated, is due to the resiliency of the skirts or aprons 22, and the expansion spring 21, the tension of the former being susceptible to variation by means of the screws 23 or other adjusting element, the latter by utilizing a spring suitable for this purpose.

The wrist pin, by virtue of my invention, becomes fully floating, in view of the fact that no cross-head pin is necessary for securing this member in applied position, thus, all of the racket and uneven wearing incident to the conventional type of wrist pin resulting in an oval wearing of the pin, and being hollow is eliminated.

Obviously numerous modifications of structure might readily be resorted to without in the least departing from the spirit of my invention, which I claim as—

1. A piston including a recessed body portion, resilient aprons forming a part of the recessed portion of said body, and means for normally confining said aprons.

2. A piston, including a body portion, resilient aprons forming a part of said body portion, and a shoe adapted to encircle said aprons.

3. A piston, including a body formed with a recessed portion in its outer face, said body portion presenting resilient aprons within said recessed portion, and a shoe adapted to encircle the body of said piston and to seat within the recessed portion of the same.

4. A piston, including a body formed with a recessed portion, said recessed portion being cut circumferentially of the piston, and being further formed with a cut longitudinally of the same, said latter cut communicating with the circumferential cuts, whereby to form a resilient apron, and a shoe adapted to encircle said apron.

5. A piston, including a body formed with a recessed portion, said recessed portion being cut circumferentially of the piston, and being further formed with a cut longitudinally of the same, said latter cut communicating with the circumferential cuts whereby to form a resilient apron, a shoe adapted to encircle said apron, and means for regulating the tension exerted by said spring.

6. A piston, including a body formed with a plurality of circumferentially extending slots, a plurality of longitudinally extending slots intersecting said circumferentially extending slots, whereby to provide a plurality of resilient aprons, a shoe, adapted to encircle said piston, and to have its inner face engaged by said aprons.

7. A piston, including a body formed with a plurality of circumferentially extending slots, a plurality of longitudinally extending slots intersecting said circumferentially extending slots, whereby to provide a plurality of resilient aprons, a shoe formed with a plurality of sections adapted to encircle said piston, and to have its inner face engaged by said aprons.

8. A piston, including a body formed with a plurality of circumferentially extending slots, a plurality of longitudinally extending slots intersecting said circumferentially extending slots, whereby to provide a plurality of resilient aprons, a shoe adapted to encircle said piston and to have its inner face engaged by said aprons, and means extending from a point adjacent the free edges of said aprons and a fixed portion of the piston for regulating the tension of the former.

9. A piston including a body, resilient aprons forming a part of said body, a shoe adapted to encircle said body and resilient aprons, said shoe presenting a plurality of sections having their abutting edges extending diagonally, the outer ends of each of said sections extending beyond the point occupied by the outermost end of the next adjacent section.

10. A piston including a body formed with openings at diametrically opposite points, a hollow wrist pin having its ends extending into said openings, and being free to move within the same, a plurality of shoes enveloping said piston and bearing against the ends of said wrist pin whereby to retain the same in applied position, each of said shoes being formed with diagonal end edges adapted to abut against the similarly formed edges of the next adjacent shoe, and a spring within said wrist pin for engaging the inner faces of said shoes and pressing the same outwardly.

11. A piston including a body portion, resilient aprons forming a part of said body portion, and screws secured to the outer ends of said aprons and having their inner ends engaging the body of said piston for regulating the tension of said aprons.

THOS. GUMI SAXTON.